United States Patent
Ferguson et al.

[11] Patent Number: 6,138,703
[45] Date of Patent: Oct. 31, 2000

[54] CHEMICAL FEEDER

[75] Inventors: Richard H. Ferguson, New Martinsville, W. Va.; Stanley R. Pickens, Monroeville; Marilyn D. Higgins, Jeannette, both of Pa.

[73] Assignee: PPG Industries, Ohio, Cleveland, Ohio

[21] Appl. No.: 09/449,258

[22] Filed: Nov. 24, 1999

[51] Int. Cl.[7] .................................................. B01F 1/00
[52] U.S. Cl. .............................. 137/1; 137/268; 422/264
[58] Field of Search ..................... 137/268, 1; 422/264, 422/261, 263

[56] References Cited

U.S. PATENT DOCUMENTS

| | | |
|---|---|---|
| 423,773 | 3/1890 | Jewell et al. . |
| 440,162 | 11/1890 | Jewell et al. . |
| 2,521,802 | 9/1950 | Otto ......................................... 210/36 |
| 2,604,446 | 7/1952 | Palmer ..................................... 210/31 |
| 3,901,262 | 8/1975 | Gutkowski ......................... 137/101.11 |
| 3,929,151 | 12/1975 | Rubin ..................................... 137/268 |
| 4,249,562 | 2/1981 | King, Sr. ................................ 137/268 |
| 4,331,174 | 5/1982 | King, Sr. ................................ 137/268 |
| 4,584,106 | 4/1986 | Held ....................................... 210/754 |
| 4,617,117 | 10/1986 | Messinger et al. .................. 210/198.1 |
| 4,662,387 | 5/1987 | King, Sr. ............................... 137/268 |
| 4,842,729 | 6/1989 | Buchan . |
| 5,089,127 | 2/1992 | Junker et al. . |
| 5,384,102 | 1/1995 | Ferguson et al. . |
| 5,427,748 | 6/1995 | Wiedrich et al. . |
| 5,447,641 | 9/1995 | Wittig . |
| 5,810,043 | 9/1998 | Grenier ................................. 137/268 |
| 5,932,093 | 8/1999 | Chulick . |

FOREIGN PATENT DOCUMENTS 200078  3/1958  Denmark .

OTHER PUBLICATIONS

HAYWARD® CL–200 Series Automatic Chlorine Feeder, Owner's Guide Installation and Operating Instructions, IS–CL–200–87, 1988.

*Primary Examiner*—Kevin Lee
*Attorney, Agent, or Firm*—James R. Franks; Irwin M. Stein

[57] ABSTRACT

Describes a chemical feeder for supplying chemical treating agents, e.g., calcium hypochlorite, to a liquid stream, e.g., an aqueous stream. The chemical feeder includes (a) a housing 11 having a chamber 12 therein for receiving solid chemical material, and a single principal opening 33 in the base 87 of the housing, (b) a valve casing 42 positioned below housing 11 and having a single first opening 36, a single second opening 39, a valve chamber 90 that provides fluid communication between openings 36 and 39, and a valve body 57 that is moveable within valve chamber 90 for selectively regulating the flow of fluid between openings 36 and 39, and (c) a fluid conduit 69 positioned below valve casing 42 and having a fluid inlet 72, a fluid outlet 75 and a feeder opening 84. First opening 36 of valve casing 42 is in fluid communication with opening 33 in base 87 of housing 11, and feeder opening 84 of fluid conduit 69 is in fluid communication with second opening 39 of valve casing 42. Fluid both enters and leaves chamber 12 through principal opening 33 in base 87 of housing 11.

23 Claims, 4 Drawing Sheets

CHEMICAL FEEDER

DESCRIPTION OF THE INVENTION

The present invention relates to a chemical feeder. Particularly, the present invention relates to a chemical feeder that is of a relatively uncomplicated design and that can be easily operated in a reliable and reproducible manner to prepare liquid compositions containing controlled amounts of chemical materials, such as a sanitizing material. The present invention also relates to methods of sanitizing a body of water using such a chemical feeder.

Liquid mediums, such as aqueous mediums, are often treated with chemical materials, e.g., flocculents and sanitizing chemicals. For example, the sanitization of an aqueous medium, such as a swimming pool, hot tub or reservoir from which a municipal water supply is drawn, typically involves adding to it a sanitizing amount of halogen or halogen-containing material, e.g., calcium hypochlorite, to establish a desired level of free available halogen, e.g., free available chlorine (FAC), in the aqueous medium. The presence of free available chlorine within the aqueous medium, such as a swimming pool, serves to eradicate deleterious amounts of bacteria that may be present. Ingestion of or even topical exposure to unsanitized or inadequately sanitized water having bacteria therein can lead to disease in animals and humans. Further, the ingestion by animals and humans of foods, e.g., harvested fruits and poultry products, that have been processed on unsanitized or inadequately sanitized surfaces can lead to disease in animals and humans. In addition, aqueous mediums to which too much sanitizing agent has been added, e.g., over treated drinking water supplies or swimming pools, may not be suitable for use, such as consumption or contact with skin and eyes.

Free available chlorine can be introduced into water by adding a source of hypochlorous acid (HOCl) or hypochlorite anion ($ClO^{31}$) to the water. Drinking water typically contains FAC in an amount of from 0.2 to 0.6 parts per million parts (ppm). Stationary bodies of water, such as swimming pools, hot tubs, spas, etc., typically contain FAC in an amount of from 1 to 3 ppm. Water having an FAC content in amounts of greater than 10 ppm can be used to sanitize surfaces or articles to which it is applied.

Liquid mediums containing chemical materials, e.g., aqueous mediums containing sanitizing chemicals, are often prepared by passing all or a portion of the liquid medium that is to be treated, through an apparatus in which the liquid medium contacts and interacts with, e.g., dissolves, the chemical material(s) held therein. Devices that may be used to treat aqueous mediums are described, for example, in U.S. Pat. Nos. 2,521,802, 2,604,446, 4,331,174, 4,617,117, 4,662,387, 4,842,729, 5,447,641 and 5,932,093.

It is desirable that a chemical feeder used to provide a solution of chemical material, e.g., sanitizing agent, which is used to treat a liquid medium, be of a design and configuration that allows for the reliable and controlled production of predetermined concentrations of chemical material in that solution, e.g., an aqueous medium that contains a desired level of FAC. It is also desirable that the amount of chemical material, e.g., sanitizing agent, introduced into the solution remains steady as the solid chemical material within the feeder is depleted.

The operation of a chemical feeder used to introduce chemical materials, such as calcium hypochlorite, into an aqueous medium, e.g., the introduction of FAC into a swimming pool, often results in the formation of solid deposits, e.g., solid calcareous deposits, such as calcium carbonate, on the interior surfaces of the feeder. The formation of such solid deposits can partially or fully occlude liquid passages within the feeder, resulting in inadequate introduction of chemical material into the aqueous medium. Typically, the formation of solid deposits within the chemical feeder requires taking the feeder off line, taking it apart and cleaning the affected parts of the feeder. Depending on how complex and delicate the design of the chemical feeder, the cleaning operation may damage various components within the feeder requiring either their replacement individually or replacement of the whole feeder. It is desirable that the design of the chemical feeder both minimize the number of surfaces upon which solid deposits can form, and facilitate cleaning of the feeder.

In accordance with the present invention, there is provided a chemical feeder comprising:

(a) a housing having sidewalls and a base, which define a chamber for receiving solid chemical material, the base of said housing having a single principal opening therein which provides fluid access to said chamber;

(b) a valve casing positioned below said housing and having a single first opening and a single second opening therein, a valve chamber positioned between said first and second openings that provides fluid communication between said first and second openings, and a valve body movable within said valve chamber for selectively regulating the flow of fluid between said first and second openings of said valve casing, said first opening of said valve casing being in fluid communication with said opening in the base of said housing; and (c) a fluid conduit positioned below said valve casing and having a fluid inlet, a fluid outlet and a feeder opening, said feeder opening being in fluid communication with said second opening of said valve casing.

In a further embodiment of the present invention, the top of the housing is closed and has a pressure valve therein that prevents automatically the pressure within the chamber of the housing from dropping below the pressure of the ambient exterior atmosphere outside of the chamber.

The features that characterize the present invention are pointed out with particularity in the claims, which are annexed to and form a part of this disclosure. These and other features of the invention, its operating advantages and the specific objects obtained by its use will be more fully understood from the following detailed description and the accompanying drawings in which preferred embodiments of the invention are illustrated and described.

Other than in the operating examples, or where otherwise indicated, all numbers or expressions, such as those expressing structural dimensions, pressures, flow rates, etc, used in the specification and claims are to be understood as modified in all instances by the term "about."

BRIEF DESCRIPTION OF THE DRAWINGS

In FIGS. 1 through 4, like reference numerals and characters designate the same components, structural features and process streams.

DETAILED DESCRIPTION OF THE INVENTION

Figure 1:
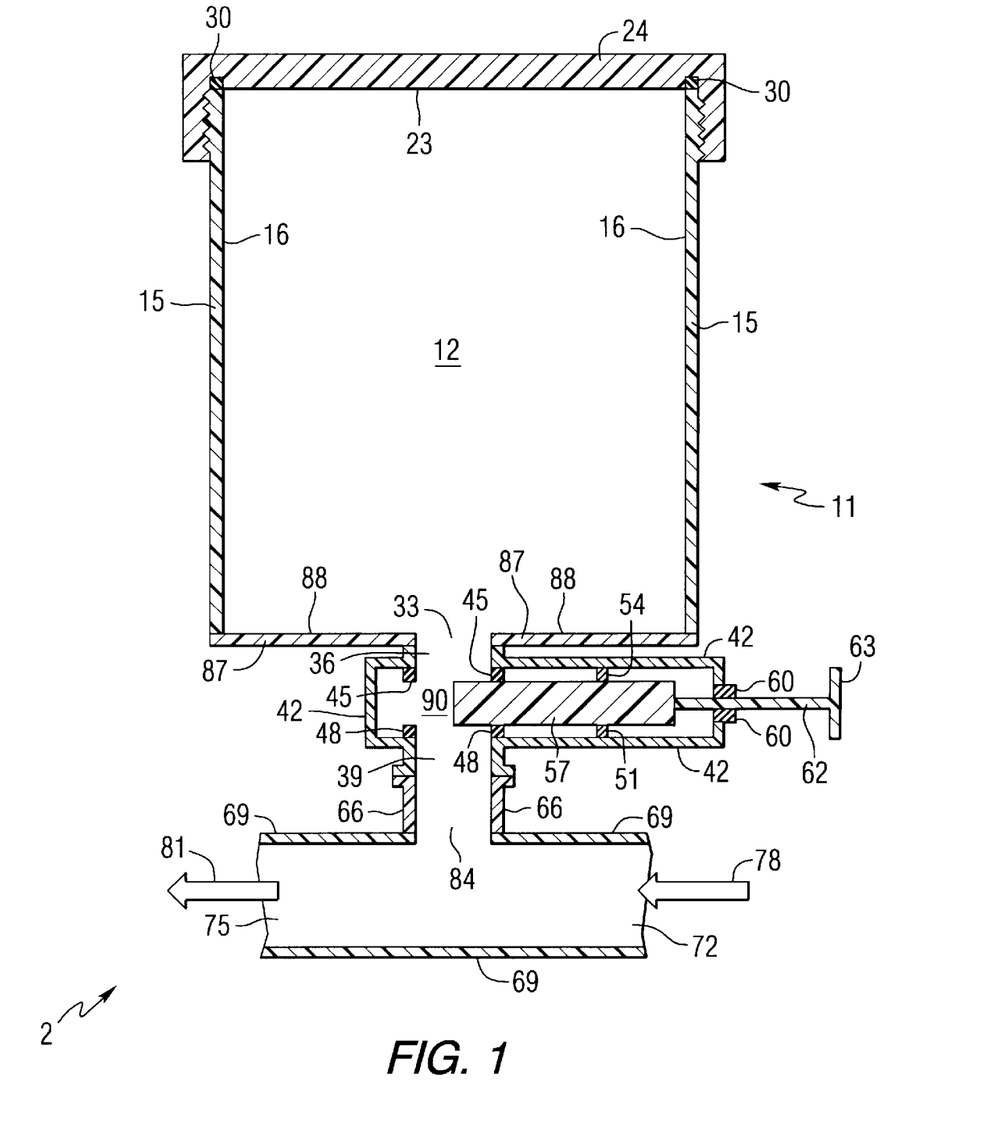
FIG. 1 is a sectional representation of a chemical feeder according the present invention.

Referring now to FIG. 1 of the drawings, there is shown feeder 2 comprising housing 11 having sidewalls 15 and a base 87 which define an internal chamber 12, and an opening 33 in base 87, which provides fluid access to chamber 12. Housing 11 of chemical feeder 2 may be substantially cylindrical, i.e., sidewalls 15 may be substantially cylindrical and base 87 may be substantially circular. Sidewalls 15 and base 87, more specifically the interior surfaces 16 and 88 of sidewalls 15 and base 87, together define chamber 12, which in a preferred embodiment is a substantially cylindrical chamber. Housing 11 may have other shapes including, for example, spherical and multi-sided shapes, e.g., square-tubular, recta-tubular, hexa-tubular and octa-tubular. When housing 11 is substantially spherical in shape, sidewalls 15 and base 87 are substantially continuous. In addition, the shape of interior chamber 12 defined by interior surfaces 16 and 88 may be different than the external shape of sidewalls 15 and base 87. For example, the exterior shape of sidewalls 15 may be square, and base 87 may be square or circular, while interior surfaces 16 and 88 define a substantially cylindrical internal chamber 12.

Base 87 is affixed to the bottom of sidewalls 15. While, base 87 may be attached to the bottom of sidewalls 15 by art recognized reversibly closeable means, e.g., by means of matching threaded sections or fasteners, it is preferably attached to sidewalls 15 by substantially permanent means, e.g., by means of adhesives and/or welds.

Housing 11 preferably has a closed top, and more preferably, the top of housing 11 is closed by means of a reversibly closeable lid. As shown, housing 11 has a reversibly closeable lid 24 attached thereto. Lid 24 engages sealingly with the top of sidewalls 15 by means of an annular gasket 30. Lid 24, more specifically the interior surface 23 of lid 24, together with the interior surfaces 16 and 88 of sidewalls 15 and base 87, also serves to define chamber 12. Lid 24 may be attached to the top of sidewalls 15 by means that are known to the skilled artisan, which include, for example, bolts, clamps or matching threaded sections. In FIG. 1, lid 24 is attached to the top of sidewalls 15 of housing 11 by means of matching threaded sections.

Chemical feeder 2 of FIG. 1 also comprises a valve casing 42, which is positioned below housing 11 and has a first opening 36, a second opening 39 and a valve chamber 90. Valve chamber 90 is positioned between openings 36 and 39 and provides fluid communication between openings 36 and 39. First opening 36 is in fluid communication with opening 33 of base 87 of housing 11. Valve casing 42 also has valve body 57, internally mounted for lateral movement within valve chamber 90, and which selectively and controllably regulates fluid communication between openings 36 and 39. Openings 36 and 39 of valve casing 42 may be offset from each other, but are preferably coaxially aligned as shown in FIG. 1.

The valve body of valve casing 42 may be selected from those known to the skilled artisan, e.g., stop-cock valves and gate valves. Valve body 57, as depicted in FIG. 1, is a gate valve that is slideably moveable within valve chamber 90, and engages sealingly and slideably with annular gaskets 45 and 48. The slideable movement of valve body 57 within valve chamber 90 is preferably substantially perpendicular to the aligned axis of each of openings 36 and 39. Valve casing 42 may also include a plurality of bearings to guide and stabilize the movement of valve body 57 within valve chamber 90, as represented by bearings 51 and 54. Valve body 57 may be moved manually or mechanically by means of shaft 62 and handle 63. As handle 63 is pushed, pulled or rotated, shaft 62 engages slideably and sealingly with gasket 60 of valve casing 42.

Shaft 62 may have indicia thereon (not shown) that indicate the degree to which opening 36 is open or closed by valve body 57. Such indicia may indicate, for example, 0 percent open/100 percent closed, 25 percent open/75 percent closed, 50 percent open or closed, 75 percent open/25 percent closed, and 100 percent open/0 percent closed. In FIG. 1, valve body 57 is shown in a 50 percent or half open position relative to opening 36 and, when of the same dimension, opening 39. In an embodiment of the present invention, the movement of valve body 57 within valve chamber 90 is achieved by means of a rotatable knob (not shown) having a gear attached thereto that engages translationally with matching teeth (not shown) in shaft 62.

Chemical feeder 2 of FIG. 1 also comprises a fluid conduit 69, which is positioned below valve casing 42 and has a fluid inlet 72, a fluid outlet 75 and a feeder opening 84. Feeder opening 84 is in fluid communication with second opening 39 of valve casing 42, by means of an intermediate conduit 66. While fluid inlet 72 and fluid outlet 75 may be offset, they are preferably horizontally and coaxially aligned as depicted in FIG. 1. In addition, fluid inlet 72 and fluid outlet 75 are interchangeable, i.e., the fluid flow through fluid conduit 69 may be reversed in which case inlet 72 becomes outlet 72 and outlet 75 becomes inlet 75. The axis of feeder opening 84 is preferably substantially perpendicular to the horizontally and coaxially aligned axis of fluid inlet 72 and fluid outlet 75 of fluid conduit 69.

Opening 33 of base 87, first and second openings 36 and 39 and valve chamber 90 of valve casing 42, and feeder opening 84 of fluid conduit 69 together provide fluid communication between fluid conduit 69 and chamber 12 of housing 11. Fluid both enters and exits chamber 12 of housing 11 by means of opening 33 in base 87. Opening 33, first opening 36, second opening 39 and feeder opening 84 may each be offset from each other, or at least any two may be substantially aligned. Preferably, opening 33, first opening 36, second opening 39 and feeder opening 84 are all substantially coaxially aligned. The substantially aligned openings, 33, 36, 39 and 84 are preferably substantially free of obstruction when valve body 57 is in a fully open position.

In a preferred embodiment of the present invention, openings 33, 36, 39 and 84 are all substantially vertically aligned, with opening 33 at the top and feeder opening 84 at the bottom of the vertically aligned openings. When opening 33, first opening 36, second opening 39 and feeder opening 84 are all substantially vertically aligned, the substantially vertically aligned axis of these openings is preferably substantially perpendicular to the substantially horizontally aligned axis of inlet 72 and outlet 75 of fluid conduit 69. It is also preferred that fluid conduit 69 be substantially free of obstruction.

In an embodiment of the present invention, the top of housing 11 of the chemical feeder is closed and has a pressure valve therein that prevents automatically the pressure within the chamber of the housing from dropping below the pressure of the ambient exterior pressure outside of the chamber. The pressure valve is preferably located in the top or upper portion of the housing of the chemical feeder such that it does not come into contact with fluid present within the chamber of the housing.

Figure 2:
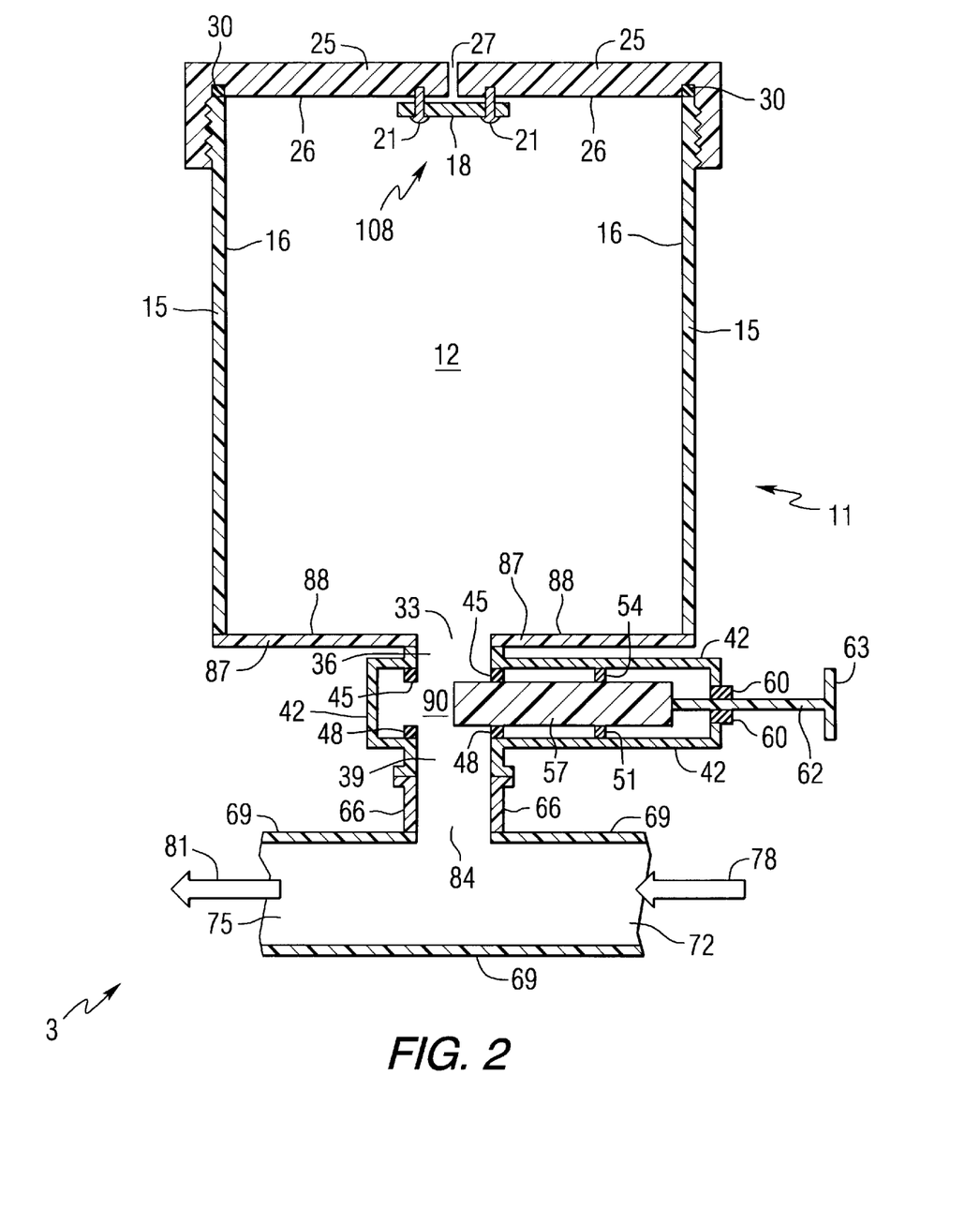
FIG. 2 is a sectional representation of a chemical feeder similar to that depicted in FIG. 1, but with the addition of a pressure valve in the lid of the housing that prevents the pressure within the chamber of the housing from dropping below the pressure of the exterior atmosphere.

With reference to FIG. 2 of the drawings, the top of housing 11 of chemical feeder 3 comprises a reversibly closeable lid 25, which has an internal surface 26, and a pressure valve 108 attached to internal surface 26 and covering reversibly vent hole 27, which extends the entire thickness of lid 25, i.e., vent hole 27 extends from chamber 12 to the ambient exterior atmosphere. Pressure valve 108 comprises a pressure valve member 18 that reversibly seals vent hole 27 in response to pressure within chamber 12 by sliding reversibly along pins 21. When the pressure within chamber 12 is greater than the pressure outside of housing 11, valve member 18 moves upwardly along pins 21 to a position sealing vent hole 27 (as depicted in FIG. 4 of the drawings). When the pressure within chamber 12 is less than the pressure outside of housing 11, valve body 18 moves downwardly along pins 21 to a position spaced from vent hole 27 (as depicted in FIGS. 2 and 3 of the drawings), thereby allowing the pressure within and without housing 11 to equalize.

In a further embodiment of the present invention, valve member 18 of pressure valve 108, is fabricated from a resilient material and is held in place by pins 21. Rather than sliding reversibly along pins 21, the resilient valve member 18 flexes reversibly between sealing and non-sealing positions relative to vent hole 27, in response to pressure differences between the pressure within chamber 12 and that outside of housing 11, as described previously herein.

Pressure valve 108 prevents fluid from being retained within chamber 12 when fluid flowing through conduit 69 is stopped. When fluid flowing through conduit 69 stops, and valve body 57 is left in an open position, a negative pressure within chamber 12 above the solid material 102 (not shown in FIG. 2, but shown in FIG. 4) can form, which causes fluid to be retained within chamber 12. The fluid retained in chamber 12 may continue to dissolve the solid chemical material, resulting in, for example, a more concentrated liquid treating solution than desired, premature depletion of the solid chemical material and/or occlusion of at least one of opening 33, first opening 36, valve chamber 90 and second opening 39 by partially dissolved and re-crystallized chemical material. With, for example, chemical feeder 3, pressure valve 108 allows air to enter chamber 12 from outside of housing 11, thus preventing fluid from being retained within chamber 12 when fluid passing through conduit 69 is stopped and valve body 57 is in an open position.

Figure 3:
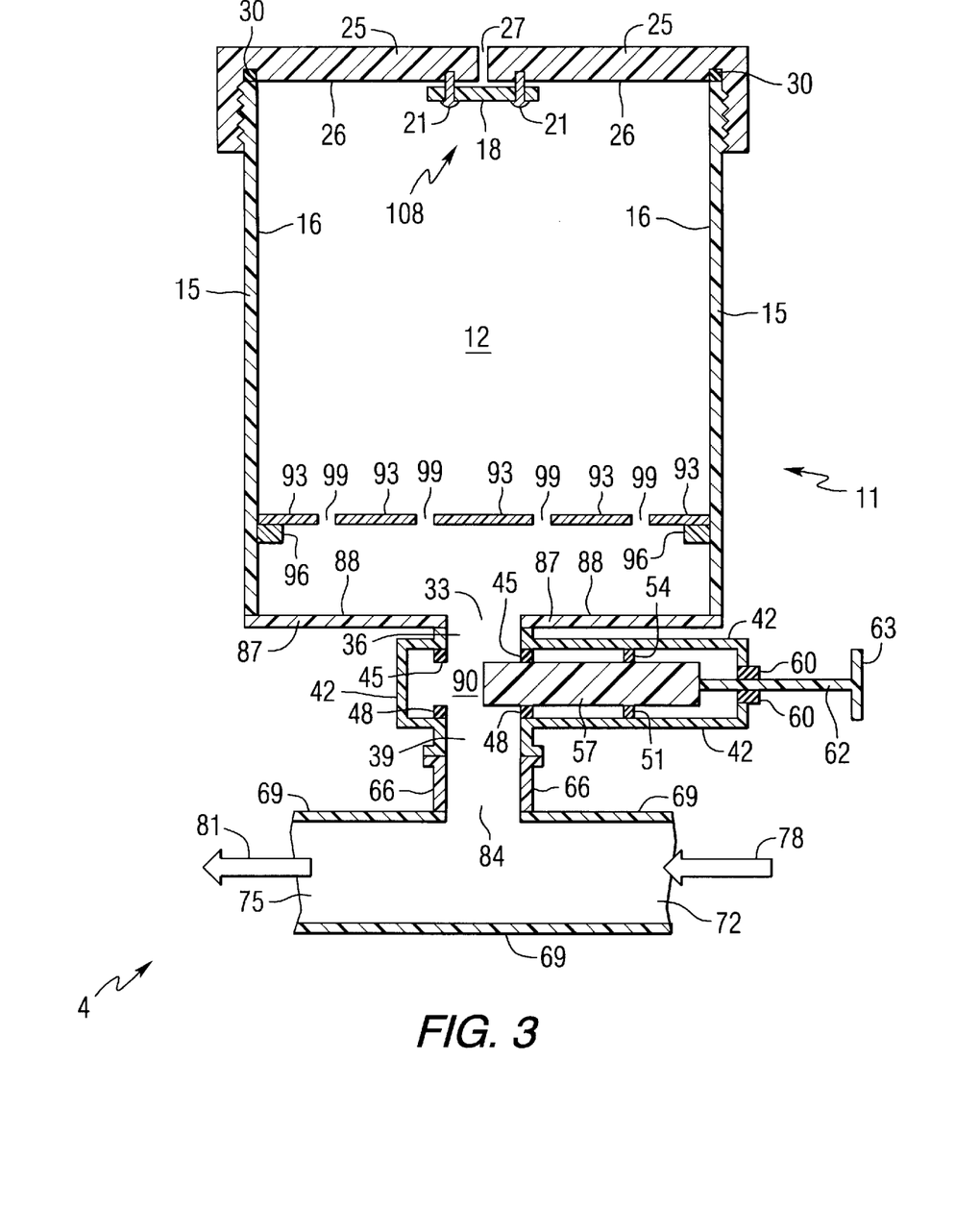
FIG. 3 is a sectional representation of a chemical feeder similar to that depicted of FIG. 2, but with the addition of a sieve plate located in the lower portion of the chamber of the housing.
Figure 4:
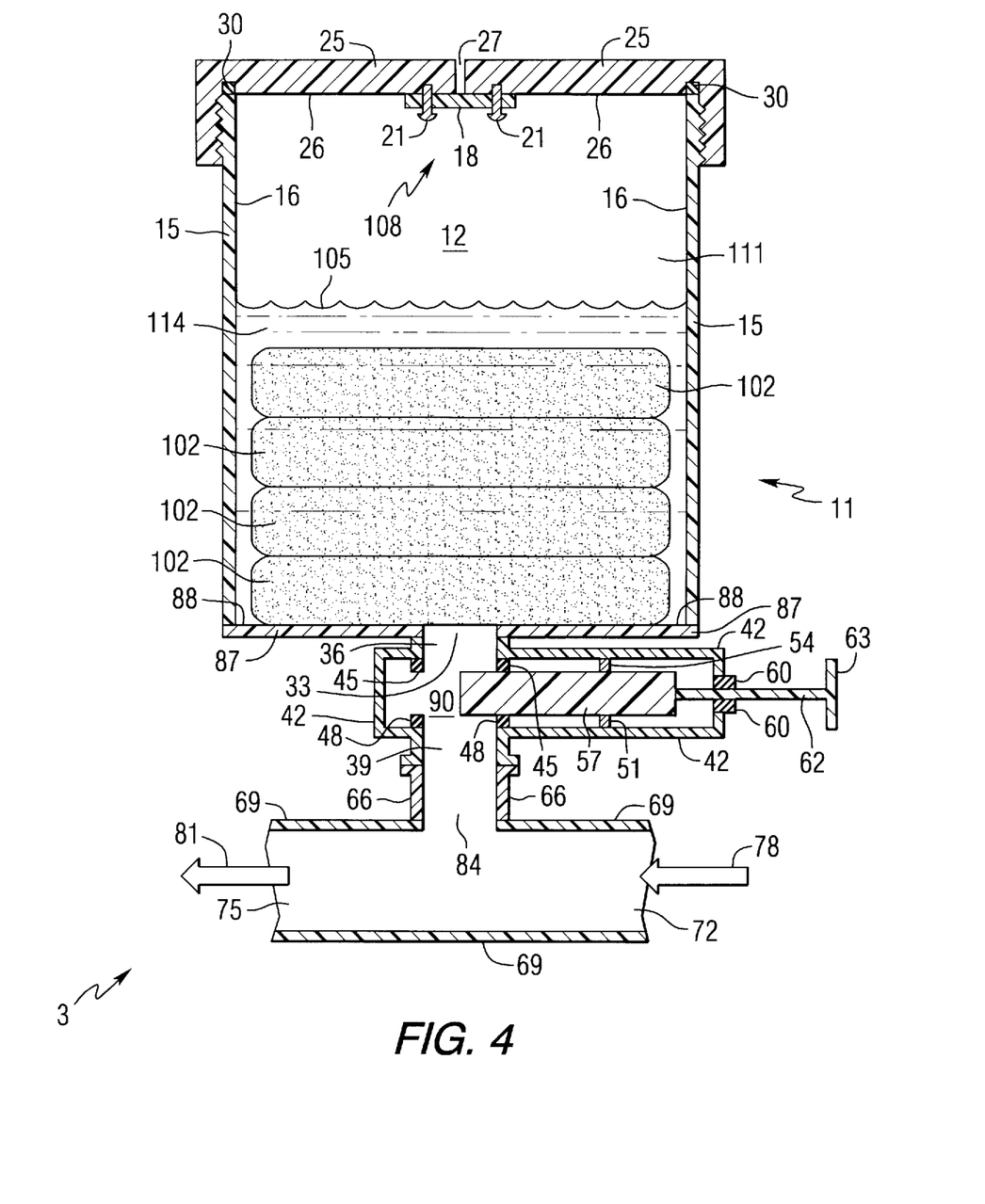
FIG. 4 is a sectional representation of a chemical feeder similar to that depicted in FIG. 2, in which solid tablets and a fluid are present in the chamber of the housing, and the pressure valve in the lid of the housing is in a sealed position.

In a further embodiment of the present invention and with reference to FIG. 3, a sieve plate 93 having a plurality of perforations 99 therein is positioned within the lower portion of chamber 12 above opening 33 in the bottom of housing 11. The sieve plate serves to prevent occlusion of opening 33 in the bottom of the housing by solid chemical material present within the chamber, while still allowing contact between the solid chemical and fluid that enters the chamber. With reference to FIG. 3 of the drawings, chemical feeder 4 has a substantially circular sieve plate 93 positioned in the lower portion of substantially cylindrical chamber 12. Sieve plate 93 has a plurality of perforations 99 therein, and is supported by an annular ring 96, which is located on interior surface 16 of sidewall 15. Sieve plate 93 may alternatively be supported by a plurality of legs or supports (not shown) that are either attached to plate 93 and extend to base 87, or attached to base 87 and extend to plate 93. Sieve plate 93 may simply rest on annular ring 96, or it may be attached thereto by suitable means, e.g., fasteners, welds or adhesives. Solid chemical material is placed in chamber 12 on top of sieve plate 93, and at least a portion of the fluid entering chamber 12 through opening 33 passes through perforations 99 and contacts the solid chemical material.

In an embodiment of the operation of chemical feeder 3, and with reference to FIG. 4, solid chemical material is charged to chamber 12 in the form of a plurality of tablets 102. Fluid is introduced continuously under pressure into fluid inlet 72 of fluid conduit 69 by means of a suitable conduit represented by line 78, and fluid is removed continuously from fluid outlet 75 by means of a suitable conduit represented by line 81. The pressure of the fluid passing through fluid conduit 69 forces fluid up through feeder opening 84, intermediate conduit 66, second valve casing opening 39, valve chamber 90, first valve casing opening 36, opening 33 of base 87 and into chamber 12 of housing 11. The fluid rises up within chamber 12 and compresses air above the rising fluid, the compressed air acts to move valve member 18 of pressure valve 108 into a position sealing vent hole 27. The fluid 114 continues to rise within chamber 12 until it reaches a fluid level (designated by line 105), which is a level where the pressure of head space 111 is in equilibrium with the pressure of the fluid passing through conduit 69. The fluid within chamber 12 contacts and slowly dissolves tablets 102.

While not intending to be bound by any theory, it is believed that fluid turbulence between chamber 12 and conduit 69 results in the movement of fluid containing dissolved chemical material back down through opening 33, valve chamber 90, intermediate conduit 66 and feeder opening 84 into conduit 69 where it mixes with fluid passing therethrough to form a treated fluid stream. The treated fluid stream exits fluid conduit 69 through fluid outlet 75, and is forwarded through conduit 81 to, for example, a point of use or storage.

Chemical feeders 2, 3 and 4 of FIGS. 1–4 and their various components may be fabricated from any suitable material or combination of materials that are chemically and corrosion resistant to the solid chemical material and fluids used. Examples of suitable fabrication materials include, but are not limited to, polyethylene, ABS (acrylonitrile-butadiene-styrene resin), fiberglass reinforced resins, polystyrene, polypropylene, poly(vinyl chloride), chlorinated poly(vinyl chloride) or any other appropriate material (s) that is chemically resistant to the solid chemical being dispensed, e.g., a sanitizing agent such as calcium hypochlorite. Other materials such as stainless steel may also be used, but the use of such material would result in a substantial increase in cost of the feeder. In a preferred embodiment, the feeder is fabricated from poly(vinyl chloride) (PVC), which is generally chemically resistant to water sanitizing chemicals, such as calcium hypochlorite. In another embodiment of the present invention, sidewall 15 is fabricated from transparent PVC, which allows for visual inspection of the amount of solid chemical material present in chamber 12 without opening housing 11. Plastic parts of the feeder may be fabricated by art-recognized methods including, for example, injection or rotation molding.

When constructed of plastic resin material, the various parts of the chemical feeder may be joined by solvent or heat welding or by threading. If a metal, such as stainless steel is used, conventional welding of the parts may be used to fabricate the feeder. Alternatively, the various parts of the feeder may be joined by conventional threaded bolts and appropriate gasketing to insure that the feeder is sealed, e.g., water-tight. Fluid inlet 72 and fluid outlet 75 of conduit 69 may be joined to conduits 78 and 81 by means of, for example, matched threaded sections, quick release fittings, plastic welding or adhesives.

The various gaskets or seals, e.g., annular gaskets 30, 45 and 48, used in the chemical feeder are typically fabricated from resilient materials that are resistant to the solid chemical materials and fluids used. Examples of materials from which the gaskets may be fabricated include, but are not limited to, rubber, e.g., natural rubber, styrene-butadiene rubber, neoprene rubber and silicone rubber; and fluorinated materials, e.g., homopolymers and copolymers of tetrafluoroethylene and chlorotrifluoroethylene, and copolymers of vinylidene fluoride and hexafluoropropylene.

The solid chemical material, or treating agent, used with the chemical feeder of the present invention may be any chemical that is solid at ambient, i.e., standard, conditions of temperature and pressure (STP), which preferably may be formed into pellets or tablets, and which is readily soluble in a fluid, e.g., water, at STP conditions. Preferably, the solid chemical material is in the form of tablets that have a diameter which is greater than the diameter of the opening in the bottom of the housing, e.g., as depicted in FIG. 4 where the diameter of tablets 102 is greater than the diameter of opening 33 in base 87 or openings 99 in sieve plate 93 of chemical feeder 4 in FIG. 3. Examples of such chemicals are sanitizing agents, e.g., chemicals that sanitize water, such as calcium hypochlorite, bromo-chloro hydantoin, dichlorohydantoin and chloroisocyanurates; dechlorination agents such as sodium sulfite, sodium metabisulfite, sodium bisulfite, sodium thiosulfate, sodium hydrosulfide (NaSH), and sodium sulfide ($Na_2S$); and pH control agents such as sodium bisulfate, citric acid, sodium carbonate, sodium bicarbonate and quaternary ammonium compounds, some of which may be used also as algaecides.

It will be readily appreciated by those skilled in the art that the chemical feeder of the present invention can be integrated into fluid, e.g., water, treatment operations by appropriate piping connected with fluid inlet 72 and fluid outlet 75 of fluid conduit 69. The chemical feeder may be integrated into, for example: a single pass system, e.g., an aqueous stream used to sanitize the surface of an article, e.g., vegetables such as potatoes or surfaces used in the handling or processing of food; or a closed loop system, e.g., a swimming pool. In a preferred embodiment, fluid conduit 69 is connected directly, i.e., in-line, with the main fluid conduit used to recycle and treat fluid, e.g., water, from a stationary body of fluid, e.g., a swimming pool.

It will be further apparent to those of ordinary skill in the art that various changes may be made to the chemical feeder of the present invention without departing from the spirit and scope thereof. For example, it is anticipated that solid chemical materials may be contained within the chamber of the housing in one or more canisters or baskets having a plurality of perforations therein, which allow for contact between the solid chemical and fluid within the chamber. The use of canisters or baskets can be advantageous when it is desirable to minimize direct contact of the solid chemical with the person who is placing it into the chamber. When one or more canisters are used to place solid chemical material within the chamber of the housing of the chemical feeder, the housing and canister may be together keyed or otherwise adapted to only allow the insertion of a specifically designed canister into the chamber. Keying of the housing and canisters can be used as a means of preventing the addition of incompatible chemical materials to the chamber, e.g., calcium hypochlorite and chloroisocyanurates. For example, interior surface 16 of sidewall 15 of chemical feeder 3 of FIG. 2 may be provided with a vertically elongated raised rectangular member (not shown) that mates slidingly with a matching vertically elongated female slot in the side of a canister that is placed within chamber 12 (not shown). These embodiments demonstrate that a wide variety of changes may be made to the chemical feeder of the present invention without significantly affecting the operation thereof.

The present invention also relates to a method of sanitizing a body of water, e.g., a swimming pool. The sanitizing method comprises, (a) providing a chemical feeder as described previously herein, wherein the chamber of the housing contains solid sanitizing material; (b) providing the valve body of the valve casing of the chemical feeder in an open position, e.g., moving the valve body from a closed position to an open position; (c) introducing under pressure an aqueous stream drawn from a body of water into the fluid inlet of the fluid conduit of the chemical feeder; (d) removing a treated aqueous stream containing sanitizing material from the fluid outlet of the fluid conduit of the chemical feeder; and (e) introducing at least a portion of the treated aqueous stream into the body of water. Steps (c) through (e) are typically performed continuously. It is to be understood that the scope of the method of the present invention is inclusive of performing step (b) after step (c).

In a preferred embodiment of the method of the present invention, the chemical feeder is located such that the opening in the bottom of the housing is at least level with (i.e., level with or above) the water level of the body of water that is being sanitized. Locating the chemical feeder in this position relative to the water level of the body of water allows water to drain out of the chamber of the housing when water flow into the fluid inlet of the fluid conduit is stopped.

The valve body of the chemical feeder may be adjusted, e.g., further opened or closed, to control the amount of fluid entering chamber 12, and as a consequence the amount of chemical sanitizing material that is present in the treated aqueous stream that is removed from the fluid outlet of the fluid conduit. Typically a sample of the treated aqueous stream is taken and analyzed to determine the amount of sanitizing agent that it contains, e.g., free available chlorine (FAC). If the sample contains less than the required amount of sanitizing agent, then the valve body of the chemical feeder is moved to a more open position. Likewise, if the sample contains more than the required amount of sanitizing agent, then the valve body of the chemical feeder is moved to a more closed position.

In the method of the present invention, the fluid conduit of the chemical feeder is typically connected directly in-line with the main water conduit used to handle water withdrawn from the body of water. In this configuration, the outlet of the pump used to recycle the water is in direct fluid communication (by means of a suitable conduit) with the fluid inlet of the fluid conduit of the chemical feeder, i.e., the chemical feeder is located on the pressure side of the recycle pump. The pressure of the aqueous stream introduced into the fluid inlet of the fluid conduit of the chemical feeder can vary widely, and is typically from 5 pounds per square inch (psi) (34 kilopascals) to 15 psi (103 kilopascals), e.g., from 5 psi to 10 psi (69 kilopascals). The flow rate of the aqueous stream through the fluid conduit of the chemical feeder can also vary widely, and is typically from 20 to 40 gallons per minute (76 to 151 liters per minute), e.g., from 25 to 35 gallons per minute (95 to 133 liters per minute).

The chemical feeder of the present invention and its operation in accordance with the method of the present invention is more particularly described in the following example, which is intended to be illustrative only, since numerous modifications and variations therein will be apparent to those skilled in the art. Unless otherwise specified, all parts and percentages are by weight.

EXAMPLE

A chemical feeder, similar to chemical feeder 3 of FIG. 2, was connected through a closed loop to an above ground pool containing about 10,000 gallons (38,000 liters) of water, by means of suitable conduits and a HAYWARD POWER-FLO II pump, commercially available from Hayward Pool Products, Inc. All of the conduits used in the recycle loop were 1.5 inch (3.8 centimeters (cm)) poly (vinylchloride) (PVC) pipe. The major structural components of the chemical feeder, e.g., lid 24, sidewalls 15, base 87, valve casing 42, valve body 57 and fluid conduit 69, were all fabricated from PVC.

Sidewall 15 of housing 11 was fabricated from transparent PVC, and had an inner diameter of 10 cm and an inner height of 14.5 cm. Opening 33 of base 87 and first opening 36 of valve casing 42 each had a diameter of 3 cm. The diameter of each of second opening 39 of valve casing 42, feeder opening 84, and the inner diameter of intermediate conduit 66 was 3.7 cm. The diameter of each of fluid inlet 72 and fluid outlet 75 of fluid conduit 69 was 4.2 cm. The distance between inner surface 88 of base 87 and feeder opening 84 was about 9 cm.

The chemical feeder was attached to the side of the above ground pool, such that opening 33 of base 87 was about 1 cm above the water level of the pool. Fluid inlet 72 of fluid conduit 69 was connected to the pressure side of the pump by means of a length of PVC pipe, and outlet 75 was connected to a length of PVC pipe that served to return the water passing through conduit 69 back to the pool. Chamber 12 of chemical feeder 3 was loaded with 4 calcium hypochlorite tablets, each having dimensions of 3.125 inches (8 cm) in diameter by 1.25 inches (3 cm) thick, weighing about two-thirds of a pound (300 grams) and containing about 65 percent available chlorine by weight. The calcium hypochlorite tablets used are available commercially from PPG Industries, Inc. under the designation ACCU-TAB blue calcium hypochlorite tablets.

With valve body 57 in a fully open position, water drawn from the pool was passed through conduit 69 at a rate of about 36 gallons per minute (136 liters per minute), at a pressure of from 7 to 9 pounds per square inch (48 to 62 kilopascals), and at a temperature of from 20° C. to 25° C. for a period of 6 hours and 25 minutes. The calcium hypochlorite tablets placed in chamber 12 were weighed both prior to and after the test period. From a comparison of tablet weights, it was determined that the calcium hypochlorite tablets that were initially placed in chamber 12 had undergone a 1185 gram reduction in mass. By calculation, it was estimated that this reduction in mass represented a total delivery of 20 ppm FAC to the pool. The rate of calcium hypochlorite tablet depletion, and correspondingly the rate of FAC delivery to the pool, can be reduced by adjusting valve body 57 of chemical feeder 3 to a position that is less than fully open, e.g., 50 percent or 75 percent closed.

These results show that a chemical feeder according to the present invention, while having a relatively uncomplicated design, is capable of delivering a significant amount of sanitizing agent to a body of water. The chemical feeder of the present invention as described in the example, is also easy to operate and clean.

The present invention has been described with reference to specific details of particular embodiments thereof. It is not intended that such details be regarded as limitations upon the scope of the invention except insofar as and to the extent that they are included in the accompanying claims.

We claim:

1. A chemical feeder comprising:
   (a) a housing having sidewalls and a base, which define a chamber for receiving solid chemical material, said base of said housing having a single principal opening therein which provides fluid access to said chamber;
   (b) a valve casing positioned below said housing and having a single first opening and a single second opening therein, a valve chamber positioned between said first and second openings that provides fluid communication between said first and second openings, and a valve body movable within said valve chamber for selectively regulating the flow of fluid between said first and second openings of said valve casing, said first opening of said valve casing being in fluid communication with said opening in the base of said housing; and
   (c) a fluid conduit positioned below said valve casing and having a fluid inlet, a fluid outlet and a feeder opening, said feeder opening being in fluid communication with said second opening of said valve casing.

2. The chemical feeder of claim 1 wherein said housing is substantially cylindrical having substantially cylindrical sidewalls and a substantially circular base.

3. The chemical feeder of claim 2 wherein said opening in said base, said first and second openings of said valve casing and said feeder opening of said fluid conduit are all substantially aligned.

4. The chemical feeder of claim 3 wherein fluid communication between the aligned openings is substantially free of obstruction when said valve body is moved to a fully open position.

5. The chemical feeder of claim 1 wherein said fluid conduit is substantially free of obstruction.

6. The chemical feeder of claim 1 wherein said valve body is a gate valve, which is slideably moveable within said valve chamber.

7. The chemical feeder of claim 1 wherein said housing has a closed top, the closed top of said housing has a pressure valve therein that prevents automatically the pressure within said chamber from dropping below the pressure of an ambient exterior atmosphere outside of said chamber.

8. The chemical feeder of claim 7 wherein the closed top of said housing has a vent hole therein extending from said chamber to said ambient exterior atmosphere, and said pressure valve comprises a pressure valve member that reversibly seals said vent hole in response to pressure within said chamber.

9. A chemical feeder comprising:
   (a) a substantially cylindrical housing having substantially cylindrical sidewalls, a substantially circular base and a lid, which define a chamber for receiving solid chemical material, said base having a single principal opening therein which provides fluid access to said chamber;
   (b) a pressure valve located in said lid, said pressure valve preventing automatically the pressure within said chamber from dropping below the pressure of an ambient exterior atmosphere outside of said chamber;

(c) a valve casing positioned below said housing and having a single first opening and a single second opening therein, a valve chamber positioned between said first and second openings that provides fluid communication between said first and second openings, and a valve body movable within said valve chamber for selectively regulating the flow of fluid between said first and second openings of said valve casing, said first opening of said valve casing being in fluid communication with said opening in said base of said housing; and (d) a fluid conduit positioned below said valve casing and having a fluid inlet, a fluid outlet and a feeder opening, said feeder opening being in fluid communication with said second opening of said valve casing.

10. The chemical feeder of claim 9 wherein said opening in said base, said first and second openings of said valve casing and said feeder opening of said fluid conduit are all substantially aligned.

11. The chemical feeder of claim 10 wherein fluid communication between the aligned openings is substantially free of obstruction when said valve body is moved to a fully open position, and said fluid conduit is substantially free of obstruction.

12. The chemical feeder of claim 11 wherein said lid has a vent hole therein extending from said chamber to said exterior ambient atmosphere, said pressure valve comprises a pressure valve member that reversibly seals said vent hole in response to pressure within said chamber.

13. The chemical feeder of claim 12 wherein said valve body of said valve casing is a gate valve, which is slideably moveable within said valve chamber.

14. The chemical feeder of claim 9 wherein said lid is reversibly closeable.

15. A method of sanitizing a body of water comprising:

(a) providing a chemical feeder comprising,
  (i) a housing having sidewalls and a base, which define a chamber, said chamber containing solid sanitizing material, said base of said housing having a single principal opening therein which provides fluid access to said chamber;
  (ii) a valve casing positioned below said housing and having a single first opening and a single second opening therein, a valve chamber positioned between said first and second openings that provides fluid communication between said first and second openings, and a valve body movable within said valve chamber for selectively regulating the flow of fluid between said first and second openings of said valve casing, said first opening of said valve casing being in fluid communication with said opening in the base of said housing; and
  (iii) a fluid conduit positioned below said valve casing and having a fluid inlet, a fluid outlet and a feeder opening, said feeder opening being in fluid communication with said second opening of said valve casing;

(b) providing said valve body in an open position;

(c) introducing under pressure an aqueous stream drawn from a body of water into said fluid inlet of said fluid conduit, said body of water having a water level;

(d) removing a treated aqueous stream containing sanitizing material from said fluid outlet of said fluid conduit; and (e) introducing at least a portion of said treated aqueous stream into said body of water.

16. The method of claim 15 further comprising locating said chemical feeder in a position such that said opening in the base of said housing is at least level with the water level of said body of water.

17. The method of claim 15 further comprising adjusting said valve body of said valve casing to control the amount of sanitizing material that is present in said treated aqueous stream.

18. The method of claim 15 wherein steps (c) through (e) are performed continuously.

19. The method of claim 16 wherein said housing is substantially cylindrical having substantially cylindrical sidewalls, a substantially circular base and a reversibly closeable lid, said sidewalls, base and lid defining said chamber.

20. The method of claim 19 wherein said lid has a pressure valve therein that prevents automatically the pressure within said chamber from dropping below the pressure of an ambient exterior atmosphere outside of said chamber, said lid having a vent hole therein extending from said chamber to said ambient exterior atmosphere, and said pressure valve comprises a pressure valve member that reversibly seals said vent hole in response to pressure within said chamber.

21. The method of claim 15 wherein said solid sanitizing material is calcium hypochlorite.

22. The method of claim 21 wherein the calcium hypochlorite is in the form of tablets.

23. The method of claim 22 wherein said body of water is a recreational body of water.

* * * * *